(No Model.) 2 Sheets—Sheet 1.

J. H. ILER.
BICYCLE SUPPORT.

No. 605,433. Patented June 7, 1898.

WITNESSES
INVENTOR
Joseph H. Iler,
by John Wedderburn
Attorney (No Model.) 2 Sheets—Sheet 2.
J. H. ILER.
BICYCLE SUPPORT.
No. 605,433. Patented June 7, 1898.
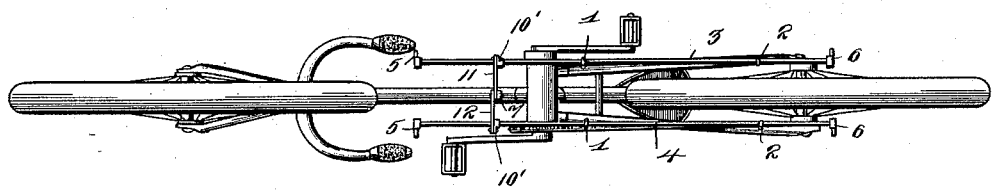
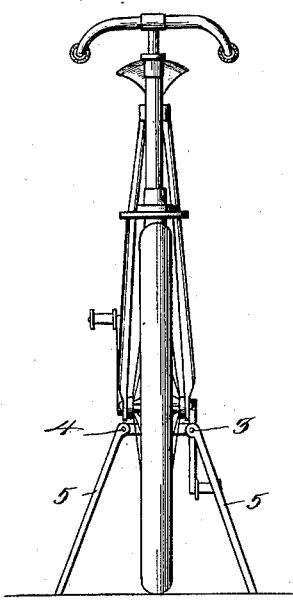
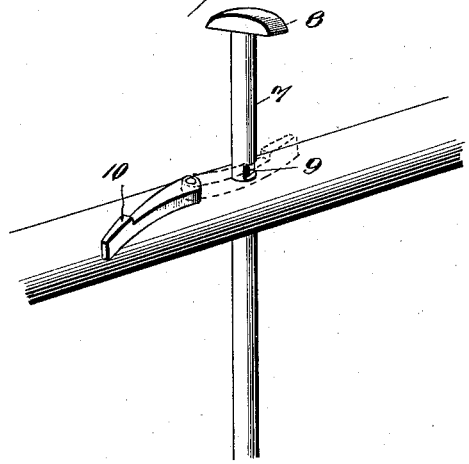
INVENTOR
Joseph H. Iler,
by John Wedderburn
Attorney

UNITED STATES PATENT OFFICE.

JOSEPH HENRY ILER, OF TROY, NEW YORK.

BICYCLE-SUPPORT.

SPECIFICATION forming part of Letters Patent No. 605,433, dated June 7, 1898.

Application filed January 16, 1897. Serial No. 619,501. (No model.)

*To all whom it may concern:*

Be it known that I, JOSEPH HENRY ILER, a citizen of the United States, residing at Troy, in the county of Rensselaer and State of New York, have invented certain new and useful Improvements in Bicycle-Supports; and I do hereby declare the following to be a full, clear, and exact description of the invention, such as will enable others skilled in the art to which it appertains to make and use the same.

My invention relates to bicycle-supports.

My object is to provide a bicycle-support of simple and cheap construction which will be of extremely light weight and ordinarily carried by the machine in such a position that it will not interfere with the movements of the rider, but which can be manipulated to support the bicycle whenever desirable.

Having this object in view, the invention consists of a bicycle-support comprising certain improved features and novel combinations of parts appearing more fully hereinafter.

Figure 1:
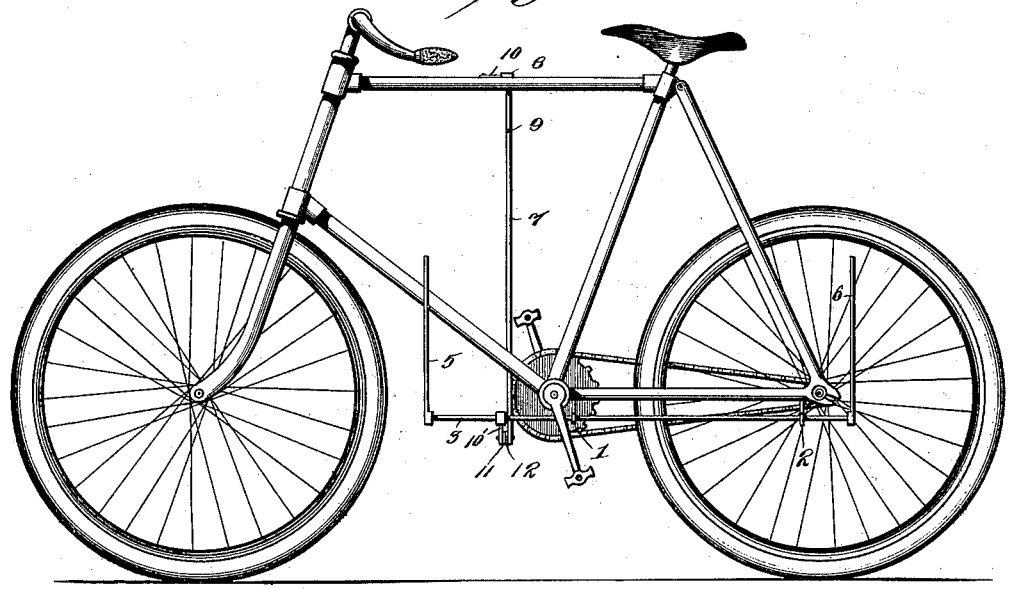
Figure 2:
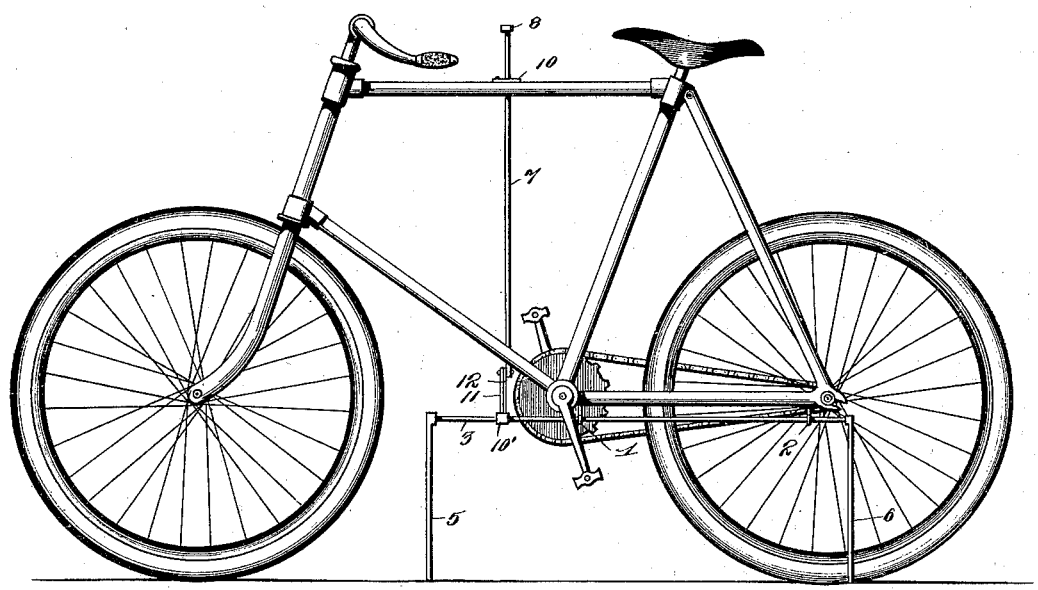

In the accompanying drawings, Figure 1 is a side elevation of a bicycle equipped with my improved support, which is shown in folded position. Fig. 2 is a similar view, but showing the support in use; Fig. 3, a front elevation showing the front supporting-legs extended; Fig. 4, a bottom view, and Fig 5 a detail view showing the coöperation of the shifting rod and the catch therefor.

Connected to each member of the rear fork of the bicycle-frame are front and rear bearings 1 and 2. I employ two shafts 3 and 4, which are journaled in the bearings, and said shafts carry on their ends legs 5 and 6. The rear legs are disposed somewhat backward of the axle of the rear bicycle-wheel and the front legs are located in the rear of the front fork. It will thus be seen that the shafts are adapted to turn, so that the legs can be raised or swung downward into contact with the ground. I employ a shifting rod 7, which passes loosely through the lower main tube and the upper main tube of the bicycle-frame. This rod carries a handle 8 on its upper end, and it is provided with a notch 9.

The numeral 10 designates a locking-catch which is pivoted to the upper main tube and is adapted to engage with the notch of the shifting rod. Each shaft has a rocker-arm 10' and links 11 and 12, pivotally connecting these rocker-arms with the lower end of the shifting rod.

The operation is as follows: The shifting rod is normally depressed and the legs held in a raised position. When, however, it is desirable to support the bicycle, the handle of the shifting rod is grasped and the said rod pulled upwardly, whereupon the connections between the rod and the shaft will cause the latter to turn and throw the legs downward into contact with the ground. The locking-catch can then be made to engage with the notch of the rod and the parts will be secured.

A device such as I have described is well adapted for use in connection with army bicycles and also on the bicycles of those learning to ride, as mounting and dismounting can be easily accomplished.

There are many slight changes which could be resorted to in carrying out the invention without detracting from any of the advantages thereof, and hence I consider myself entitled to all such changes as properly come within the spirit and scope of the invention.

Having thus described my invention, what I claim as new, and desire to secure by Letters Patent, is—

1. In a bicycle-support, the combination with bearings connected to the opposite members of the rear fork, of horizontally-disposed shafts mounted in said bearings and located on opposite sides of said fork, front and rear legs carried at the opposite ends of said shafts, a reciprocable shifting bar or rod located in advance of the rear fork and passing vertically through the adjacent parts of the frame, said rod having an upper head and a notch therein below the head, a catch to engage the said notch in the shifting bar or rod, rocker-arms connected to the front portion of the shafts, and links pivotally connected to the rocker-arms and the lower end of the shifting bar on a single pivot, substantially as described.

2. In a bicycle-support, the combination with bearings connected to members of the rear fork, of horizontal shafts positioned on opposite sides of said fork and rotatably mounted in said bearings, legs connected to the opposite ends of said shafts, and means located in advance of the rear fork for operating said shafts and legs, substantially as described.

In testimony whereof I have signed this specification in the presence of two subscribing witnesses.

JOSEPH HENRY ILER.

Witnesses:
E. H. SWEET,
CHAS. W. OLMSTEAD.